(12) United States Patent
Han et al.

(10) Patent No.: US 8,984,207 B2
(45) Date of Patent: Mar. 17, 2015

(54) MEMORY SYSTEM PERFORMING INCREMENTAL MERGE OPERATION AND DATA WRITE METHOD

(75) Inventors: Seunghyun Han, Seoul (KR); Mi-Hyang Lee, Hwaseong-si (KR); Jong Youl Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 545 days.

(21) Appl. No.: 13/309,249

(22) Filed: Dec. 1, 2011

(65) Prior Publication Data

US 2012/0144095 A1 Jun. 7, 2012

(30) Foreign Application Priority Data

Dec. 3, 2010 (KR) ........................ 10-2010-0122922

(51) Int. Cl.
*G06F 13/00* (2006.01)
*G06F 12/02* (2006.01)

(52) U.S. Cl.
CPC .... *G06F 12/0246* (2013.01); *G06F 2212/7201* (2013.01)
USPC .................................. 711/103; 711/E12.008

(58) Field of Classification Search
CPC .................................................. G06F 12/0246
USPC .......................................... 711/103, E12.008
See application file for complete search history.

(56) References Cited

U.S. PATENT DOCUMENTS

| 6,871,259 | B2 | 3/2005 | Hagiwara et al. | |
|---|---|---|---|---|
| 2004/0193774 | A1* | 9/2004 | Iwata et al. | 711/1 |
| 2006/0004971 | A1* | 1/2006 | Kim et al. | 711/154 |
| 2008/0120488 | A1* | 5/2008 | Woo et al. | 711/209 |
| 2008/0201518 | A1 | 8/2008 | Kim et al. | |
| 2009/0193191 | A1* | 7/2009 | Bae et al. | 711/115 |
| 2009/0248965 | A1* | 10/2009 | Lee et al. | 711/103 |

FOREIGN PATENT DOCUMENTS

| KR | 1020060001393 A | 1/2006 |
|---|---|---|
| KR | 1020080045833 A | 5/2008 |
| KR | 1020090093626 A | 9/2009 |

* cited by examiner

*Primary Examiner* — Edward Dudek, Jr.
(74) *Attorney, Agent, or Firm* — Volentine & Whitt, PLLC

(57) ABSTRACT

Disclosed is a method of executing a write operation in a nonvolatile memory system. The method includes receiving a write command indicating the write operation and write data associated with the write operation, and determining a selected merge size for use by a merge operation responsive to the write command by determining a number of free blocks and then determining a selected free block level (FBL) from among a plurality of FBLs in accordance with the number of free blocks.

9 Claims, 15 Drawing Sheets

MEMORY SYSTEM PERFORMING INCREMENTAL MERGE OPERATION AND DATA WRITE METHOD

CROSS-REFERENCE TO RELATED APPLICATIONS

This application claims the benefits under 35 U.S.C §119 of Korean Patent Application No. 10-2010-0122922 filed Dec. 3, 2010, the subject matter of which is hereby incorporated by reference.

BACKGROUND OF THE INVENTION

Embodiments of the inventive concept relate to memory systems and data write methods capable of adaptively controlling the size of a merge operation in accordance with a number of free blocks and a write pattern.

Certain non-volatile memory systems, such as flash memory systems, have become design mainstays for contemporary handheld electronic devices such as digital cameras, MP3 players, cellular phones, PDA, etc. Flash memory in particular provides nonvolatile memory functionality at low-power with high memory cell integration density.

As is conventionally understood, however, flash memory is often characterized by an erase unit (i.e., the nominal unit size of memory space erased during an erase operation) that is different from a write unit (i.e., the nominal unit size of memory space written to during a program operation). For this reason, certain specialized software commonly referred to as a "flash translation layer" or "FTL" is used to compensate for the size different between the erase unit and the write unit. One important function provided by the FLT is address mapping. During address mapping, the FTL essentially converts a logical address provided by a connected host into a physical address associated with the actual storage of data within the memory array of one or more flash memory device(s).

During a write (or program) operation, "write data" to be stored in a designated data block may first be written in a so-called "log block". In the event that all pages of the log block are currently in use, the FTL may perform a merge operation during which data in the log block as well as data in a data block corresponding to a log block entry are copied to a new data block, thereby essentially freeing up resources for the current write operation.

Recognizing this sort of necessary memory system management overhead, the overall speed of write operations executed by a memory system will vary in relation to the speed with which data is written in a log block and the speed with which resulting merge operations may be performed.

SUMMARY OF THE INVENTION

Certain embodiments of the inventive concept are directed to methods of executing write operations in a nonvolatile memory system using a dynamically determined merge size for necessary merge operations.

In one embodiment, the inventive concept provides a method of executing a write operation in a nonvolatile memory system. The method comprises; receiving a write command indicating the write operation and write data associated with the write operation, and determining a selected merge size for use by a merge operation responsive to the write command by determining a number of free blocks and then determining a selected free block level (FBL) from among a plurality of FBLs in accordance with the number of free blocks.

In another embodiment, the inventive concept provides a method of executing a write operation in a nonvolatile memory system including a plurality of memory blocks, the method comprising; receiving a write command indicating the write operation and write data associated with the write operation, determining a number of free blocks and a number of bad blocks among the plurality of memory blocks, selecting a set of free block level (FBL) threshold references from among a collection of FBL threshold reference sets in accordance with the number of bad blocks, using the selected set of FBL threshold references and the number of free blocks to determine a selected FBL from among a plurality of FBLs, and determining a selected merge size for use by a merge operation responsive to the write command in accordance with the selected FBL.

In another embodiment, the inventive concept provides a memory system comprising; a nonvolatile memory device including a plurality of memory blocks, and a memory controller configured in response to a write command indicating a write operation for write data to control the nonvolatile memory device and selects a merge size for use during a merge operation responsive to the write command, wherein the memory controller selects the merge size by determining a number of free blocks and then determining a selected free block level (FBL) from among a plurality of FBLs in accordance with the number of free blocks.

In another embodiment, the inventive concept provides a memory system comprising; a nonvolatile memory device including a plurality of memory blocks, and a memory controller configured in response to a write command indicating a write operation for write data to control the nonvolatile memory device, wherein the memory controller includes a flash translation layer (FTL) that is configured to; determine a number of free blocks and a number of bad blocks among the plurality of memory blocks, select a set of free block level (FBL) threshold references from among a collection of FBL threshold reference sets in accordance with the number of bad blocks, using the selected set of FBL threshold references and the number of free blocks, determine a selected FBL from among a plurality of FBLs, and determine a selected merge size for use by a merge operation responsive to the write command in accordance with the selected FBL.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
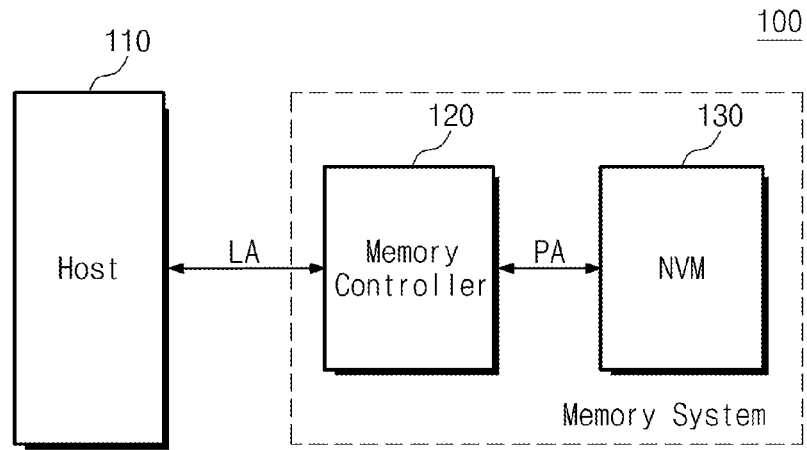
FIG. 1 is a block diagram illustrating a user device according to an exemplary embodiment of the inventive concept.

The inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the scope of the inventive concept to those skilled in the art. Throughout the written description and drawings, like reference numbers and labels refer to like or similar elements.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereafter, certain features, aspects and functions related to embodiments of the inventive concept will be described in the context of an exemplary flash memory device serving as a nonvolatile data storage medium. However, the inventive concept is not limited thereto. Other nonvolatile memory devices may be used as a storage medium. For example, the storage medium may be formed of a PRAM, an MRAM, a ReRAM, a FRAM, a NOR flash memory, or etc. or a memory system including different types of memory devices.

The term "free block" will be used hereafter in the context of a nonvolatile storage device having a memory area that is managed according to an erase-after-write approach. In the context of a nonvolatile memory device erased on a block unit, the term "free block" may be used to indicate a memory block erased after a merge operation. The term "free block" may be used to indicate one or both of erased block(s) and memory blocks currently storing only invalid data. That is, the term "free block" may be used to indicate any memory block capable of properly being overwritten by a current write operation.

FIG. 1 is a block diagram illustrating a user device according to an embodiment of the inventive concept. Referring to FIG. 1, a user device 100 generally comprises a host 110 and a memory system. The memory system in the illustrated embodiment of FIG. 1 comprises a memory controller 120 and a nonvolatile memory device 130.

Upon receiving a write command (i.e., one or more commands or combinations of control signals indicating an intent to store identified data in memory), the host 110 provides the memory system with write data having a particular logical address LA. For example, the host 110 may be a handheld electronic device such as PDA, PMP, MP3 player, etc., or a consumer electronic device such as a computer, laptop, HDTV, and the like.

The memory controller 120 may be configured as an interface between the host 110 and one or more nonvolatile memory device(s) 130. Thus, the memory controller 120 will control execution of a write operation by the nonvolatile memory device 130 in response to the write request, and will control the execution of a read operation by the nonvolatile memory device 130 in response to a read command.

The memory controller 120 may store write data provided from the host 110 in a log block of the nonvolatile memory device 130. Data stored in the log block may be copied to a new data block during a merge operation. Upon receiving a write request, the memory controller 120 may use at least one free block as a log block. A data block erased after a merge operation or a log block may be converted into a "new" free block. Any and all normally operating memory blocks may be used as a data block, a log block, or a free block during a merge operation.

The memory controller 120 may cause a full merge operation (defined by a maximum merge size, e.g., a memory block) or an incremental merge operations (defined by a merge size less than the full merge size). Hence, the incremental merge operation is an operation wherein only part of a full merge operation is executed during a single command process cycle. There are many reasons why an incremental merge operation might be performed, but most of these reasons relate to memory systems resource and/or timing constraints. By means of the incremental merge operation, the equivalent of a full merge operation may executed over a number of free blocks during more than one write command process cycle. Alternately, less than a full merge operation may be called for, and the incremental merge operation may be used to good effect. As a result and at any given time, use of an incremental merge operation may result in an indication within the memory system that a merge operation has been partially performed.

In particular, the memory controller 120 may adaptively adjust the parameters of an incremental merge operation in accordance with certain memory system conditions (e.g., a current operating state for the nonvolatile memory device 130, or characteristics of data provided from the host 110). For example, the memory controller 120 may perform an incremental merge operation in response to a particular write pattern associated with data provided by the host 110, and in accordance with a current number of free blocks, as determined by a constituent FTL. That is, the memory controller 120 may be configured to adaptively adjust such parameters as the "merge size" and the resulting "merge execution time" in response to one or more memory systems conditions.

For example, according to an incremental merge operation consistent with embodiments of the inventive concept, a current number of free blocks will be considered when defining the execution parameters of an incremental merge operation and even a decision as to whether or not the incremental merge operation should be executed. For example, when "sufficient" free blocks are available to write the data indicated by the write operation and the data is sequentially presented, then a merge operation may not be necessary and may be skipped. Of course, "sufficiency" is a determination that must be adaptively made in view of current resource availability. Where insufficient or possibly sufficient resources are presented (e.g., respective numbers of currently available free blocks), the write command may result in an incremental merge operation being executed using variable parameters, such as merge size.

One factor that may be used to determine overall memory system write performance is the speed with which so-called "sequential write data" may be written. Incremental merge operations consistent with embodiments of the inventive concept may allow certain merge operation that are conventionally necessary to be skipped entirely for sequential write data. Since the execution of merge operations tend to decrease memory system performance, the elimination of merge operations associated with sequential write data allows commensurate improvement in write operation performance.

The memory controller 120 of FIG. 1 is assumed to include an FTL. The FTL forms at least part of the interface between a file system for the host 110 and the nonvolatile memory device 130 and may be used to functionally "hide" the execution of erase operations in the nonvolatile memory device 130. As a result, the drawbacks associated with the mismatch noted above between the erase unit and write unit in the context of an erase-before-write functionality may be remediated by use of the FTL. During write operations executed in relation to the nonvolatile memory device 130, the FTL maps a logical address LA generated by the file system onto a physical address PA associated with the nonvolatile memory device 130.

The nonvolatile memory device 130 of FIG. 1 may be implemented using NAND flash memory, NOR flash memory, and/or such next-generation nonvolatile memories as the PRAM, MRAM, ReRAM, FRAM, etc. Additionally, the non-volatile memory device 130 may include certain volatile memory such as the DRAM and SRAM.

Consistent with the above description, a memory system according to an embodiment of the inventive concept may perform incremental merge operations in accordance with a write pattern for data to be written to a log block, in view of a current number of free blocks, and possibly other memory system conditions. For example, if a great many free blocks are required by a particular operation, the memory controller 120 may increase an amount of incremental merge. Conversely, if sufficient free blocks exist, the memory controller 120 may decrease the amount of incremental merge. As a result, if a free block pool contains sufficient free blocks, the FTL may skip or minimize a merge operation for a command process cycle for write data having a sequential write pattern. Accordingly, the write performance for operations writing data having a sequential write pattern may be improved.

Figure 2:
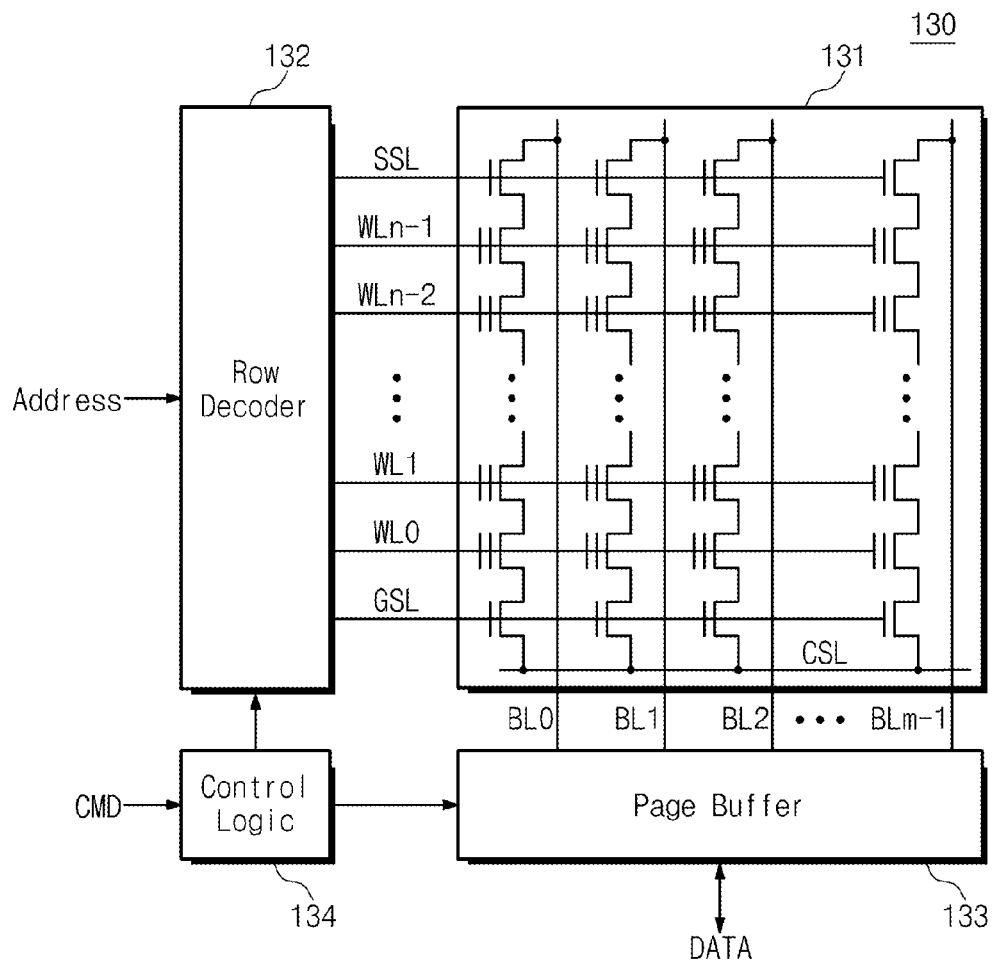
FIG. 2 is a block diagram illustrating a nonvolatile memory device in FIG. 1 according to an exemplary embodiment of the inventive concept.

FIG. 2 is a block diagram further illustrating in relevant portion the nonvolatile memory device of FIG. 1 according to an embodiment of the inventive concept. Referring to FIG. 2, a nonvolatile memory device 130 comprises a cell array 131, a row decoder 132, a page buffer 133, and control logic 134.

The cell array 131 may include a plurality of memory blocks. In FIG. 2, there is exemplarily illustrated the cell array 131 including one memory block. Each of memory blocks may be formed of a plurality of pages. Each page may be constituted of a plurality of memory cells. In the nonvolatile memory device 130, an erase operation may be executed by the memory block, and a write or read operation may be executed by the page.

The cell array 131 may include a plurality of memory cells, which are arranged to have a cell string structure. One cell string may include a string selection transistor SST connected with a string selection line SSL, a plurality of memory cells connected with a plurality of word lines WL0 to WLn−1, and a ground selection transistor GST connected with a ground selection line GSL. The string selection transistor SST may be connected with a bit line BL and the ground selection transistor GST may be connected with a common source line CSL.

The cell array 131 can include a substrate and a plurality of cell strings which are formed to be vertical to the substrate. In this case, each cell string may include a plurality of cell transistors stacked in a direction vertical to the substrate. In other words, the cell array 131 may be formed to have a three-dimensional structure (or, a vertical structure).

The row decoder 132 may be connected with the cell array 131 via the selection lines SSL and GSL and the word lines WL0 to WLn−1. At a program or read operation, the row decoder 132 may receive an address to select one word line (e.g., WL1). The row decoder 132 may transfer a voltage needed for a program or read operation to a selected word line or an unselected word line.

The page buffer 133 may operate as a write driver or a sense amplifier. The page buffer 133 may store data to be programmed in selected memory cells or data read therefrom temporarily. The page buffer 133 may be connected with the cell array 131 via bit lines BL0 to BLm−1. At a program operation, the page buffer 133 may receive data to transfer it to memory cells of a selected page. At a read operation, the page buffer 133 may read data from memory cells of a selected page to output it to an external device.

The control logic 134 may control reading, writing, and erasing of the nonvolatile memory device 130. For example, at a program operation, the control logic 134 may control the row decoder 132 such that a program voltage is applied to a selected word line. The control logic 134 may control the page buffer 133 such that program data is provided to a selected page.

Figure 3:
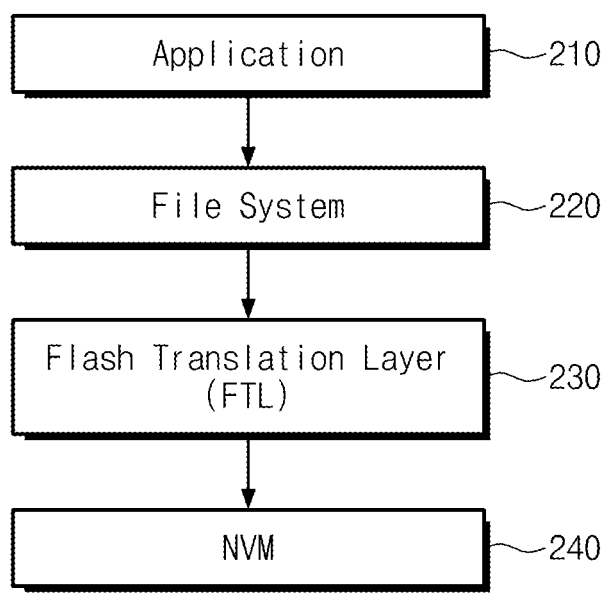
FIG. 3 is a block diagram illustrating a layer structure of software for driving a memory system in FIG. 1.

FIG. 3 is a conceptual diagram illustrating related software components that may be used to operate (or "drive") the memory system in FIG. 1. The illustrated software components are shown in established hierarchical relationships. Referring to FIG. 3, a flash translation layer (FTL) 230 translates logical addresses (e.g., a sector address and a sector number) provided in response to the operation of an application 210 and a file system 220 into a physical address PA.

The FTL 230 may use an address mapping table to map a physical address associated with a nonvolatile memory device 240 onto a logical address LA. Of note, the FTL 230 may be entirely driven within the memory controller 120 of FIG. 1. Alternatively, functional portions of the FTL 230 may be separately be driven by the host 110 and the memory controller 120.

As is conventionally understood, address mapping by the FTL 230 may be variously accomplished according to a defined mapping unit. Representative address mapping methods include page mapping, block mapping, and hybrid mapping.

Upon receiving a write request, the FTL 230 may adaptively perform an incremental merge operation in accordance with a current number of free blocks and in response to a noted write pattern for write data. If free blocks are sufficient, the FTL 230 may execute the incremental merge operation during a command process cycle using a random write pattern. The FTL layer 230 may skip a merge operation during a command process cycle when the write data has a sequential write pattern.

Figure 4:
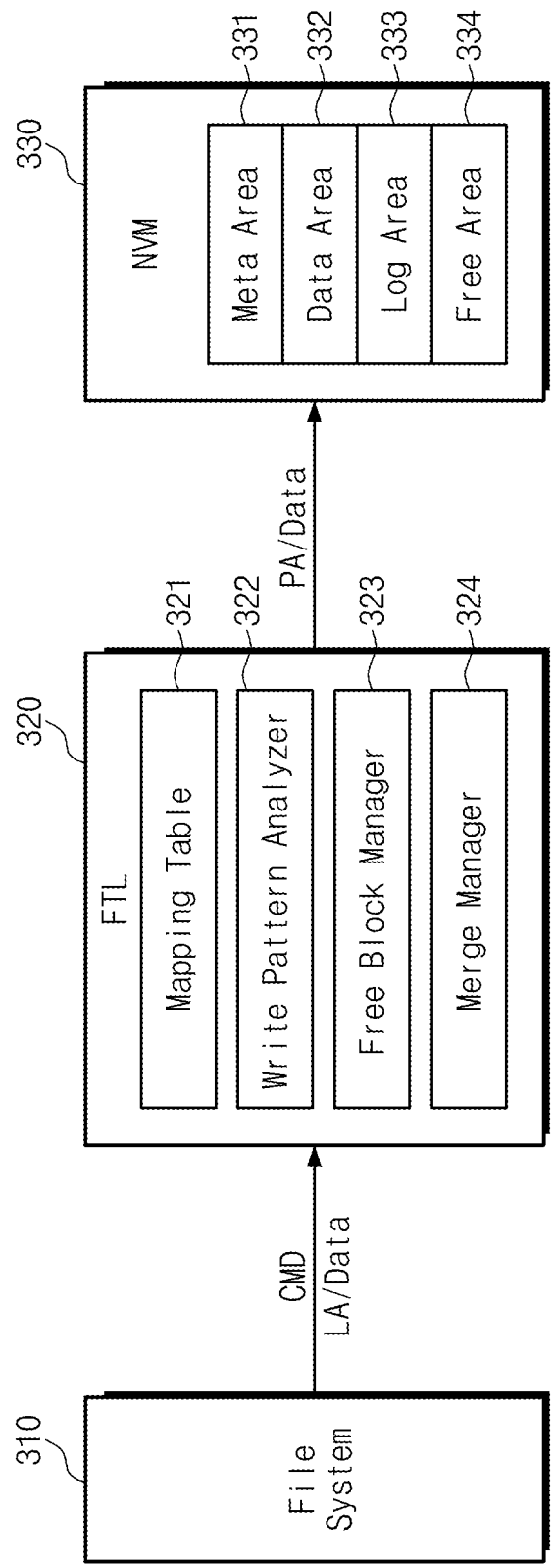
FIG. 4 is a block diagram illustrating a software layer of a memory system.

FIG. 4 is a conceptual diagram further illustrating certain of the software components shown in FIG. 3 in the context of a memory system 300. Referring to FIG. 4, the memory system 300 comprises a file system 310, a flash translation layer (FTL) 320, and a nonvolatile memory device 330. The FTL 320 receives a write command CMD, write data, and a logical address LA from the file system 310. The FTL 320 then translates the logical address LA into a physical address PA using a mapping table 321.

The FTL 320 may include modules such as the mapping table 321, a write pattern analyzer 322, a free block manager 323, and a merge manager 324. The FTL 320 may be used to translate a logical block number LBN into a physical block number PBN by referring to the mapping table 321.

The write pattern analyzer 322 may be used to detect a write pattern based upon at least one of a write command CMD, write data, and a logical address LA received from the file system 310. The detected write pattern may be provided to the merge manager 324. In the event that the size of continuously input data is less than a predetermined reference size (e.g., 16 KB), the write pattern analyzer 322 will recognize the input data as having a random write pattern. The write pattern analyzer 322 may alternately or additionally determine the nature of a write pattern using an algorithm such as LRU (Least Recently Used) algorithm, CFLRU (Clean-First LRU) algorithm, CA (Clock Algorithm) algorithm, SC (Second Chance) algorithm, MDH (Multi-Dimensional Hashing) algorithm, etc. However, embodiments of the inventive concept are not limited to one particular approach to analyzing the write pattern for all or part of a given block of write data.

The free block manager 323 may be used to manage free blocks included in a free block pool that is managed by the nonvolatile memory device 330. The free block manager 323 may be used to provide an indication to the merge manager 324 of a number of free blocks.

The merge manager 324 may execute an incremental merge operation in which a merge size is adaptively adjusted in accordance with the number of free blocks, and/or a write pattern indication provided by the write pattern analyzer 322. If the number of free blocks is sufficient, the merge manager 324 may minimize or skip a merge operation during a command process cycle corresponding to an indication of a sequential write pattern. On the other hand, if the number of free blocks is insufficient, a merge operation may be executed incrementally during a number of write command cycles regardless of write pattern for the write data. In this manner, the merge manager 324 may skip unnecessary merge operations when a sequential write pattern is indicated.

The nonvolatile memory device 330 may include a meta area 331, a data area 332, a log area 333, and a free area 334. The meta area 331 may store mapping information changed due to a merge operation or garbage collection. Mapping and control information generated by the flash translation layer 320 may be stored in the meta area 331.

The data area 332 may be formed of a plurality of data blocks and may be used to store user data. The log area 333 may be formed of one or more log blocks. The log area 333 may be used to buffer write data to be stored in a selected data block. During a merge operation, valid pages in the log block and valid pages in a data block may be copied to a new data block. An FTL 320 operated in accordance with an embodiment of the inventive concept may disperse a merge operation over a plurality of write command cycles. The size of an incremental merge operation thus dispersed and the corresponding incremental merge operation execution time may adaptively varied in accordance with the number of free blocks indicated in the free area 334 and the indicated write pattern for the write data.

The free block pool noted above may be configured in the free area 334. A free block may be converted to a log block when the number of log blocks is deemed insufficient. That is, a data block erased after a merge operation or a log block may be identified as a "new" free block. A memory block may be converted to a data block, a log block, or a free block by a merge operation. Mapping information updated as a result of the merge operation may be stored in the meta area 331.

Certain operating modules that may be included within a FTL according to embodiments of the inventive concept will be described briefly hereafter. In particular, the merge manager 324 may perform an adaptive incremental merge operation according to the number of free blocks and a write pattern for write data.

Figure 5:
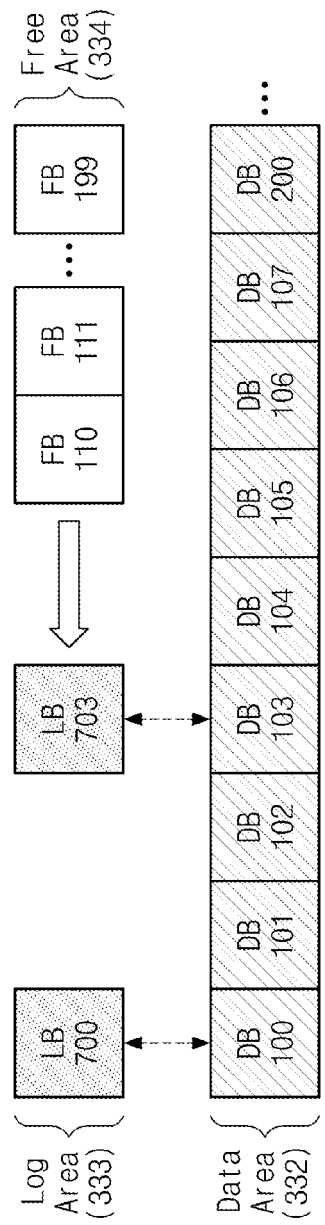
FIG. 5 is a diagram illustrating a merge operation according to an exemplary embodiment of the inventive concept.

FIG. 5 is a diagram illustrating a merge operation according to an embodiment of the inventive concept. Referring to FIGS. 1 and 5, the memory controller 120 may partition memory blocks of the nonvolatile memory device 130 into a data area 332, a log area 333, and a free area 334 during a write operation.

The data area 332 may include data blocks in which data is has been previously written. For example, the data area 332 may include memory blocks corresponding to physical block numbers PBN 100, 101, 102, 103, 104, 105, 106, 107, 200, etc.

The log area 333 may include log blocks used to update an identified data block. For example, the log area 333 may include log blocks having physical block numbers 700 and 703. The log block 700 may be assigned to update the data block 100. The log block 703 may be assigned to update the data block 103.

The free area 334 may include erased memory blocks or block storing only invalid data, as the result (e.g.) of a merge operation or garbage collection process. It is assumed in the illustrated example of FIG. 5 that the free area 334 includes memory blocks having physical block numbers 110, 111, . . . , 199. If a new log block is needed during a write operation, one of free blocks in the free area 334 may be converted to a log block.

At least one free block must be assigned to a data block. That is, in the memory system of FIG. 1, two physical blocks may be assigned to a logical block selected by the host 110. For example, the memory controller 120 may assign the data block 100 and the log block 700 to one logical block indicated by a logical address LA received from the host 110.

A 1:2 hybrid mapping method is assumed for the example illustrated in FIG. 5. Using 1:2 mapping, the log block 700 may be used to update page data corresponding to the data block 100 only. However, incremental merge methods according to embodiments of the inventive concept are not limited to only hybrid mapping method or to 1:2 mapping methods. The inventive concept may be applied to all type of mapping methods capable of managing free blocks or memory blocks serving a similar purpose.

If a write operation is requested by the host 110, the memory controller 120 check whether or not a log block assigned to a corresponding data block appointed from the host 110 exists. If a log block assigned to a corresponding data block exists, it may be used. If no log block assigned to a corresponding data block exists, the memory controller 120 may assign one of free blocks in the free area 334 to a new log block.

If updated data in the log block 700 and valid data in the data block 100 have a size corresponding to a data block, then the log block 700 and the data block 100 may be merged. That is, valid page data in the log and data blocks 700 and 100 may be copied to one block in the free area 334 in an in-place-order. A free block to which merged data is copied may then be identified as a new data block having a corresponding logical address LA provided from the host 110. Following the merge operation, the log block 700 and data block 100 may be erased, and the erased blocks may then be assigned to the free area 334.

Within a memory system according to an embodiment of the inventive concept, the foregoing merge operation may be dispersed over a plurality of command execution periods. That is, only part of the merge operation will be executed during a process cycle associated with a single write command. Using an incremental merge operation according to an embodiment of the inventive concept, the amount of data associated with a "partial merge operation" executed during a single write command cycle may be varied. For example, the amount of data stored during the partial merge operation may be determined in accordance with a current number of free blocks included in the free area 334 and/or a write pattern for the write data being stored.

In one aspect, a write method consistent with an embodiment of the inventive concept may define the "merge size" (i.e., an amount of data stored) of a partial merge operation executed during a single command process cycle of an ongoing merge operation according to a current number of free blocks in the free area 334. For example, if the number of free blocks is sufficient, execution of the merge operation may be skipped during a single command process cycle writing data with a sequential write pattern. Accordingly, it is possible to maximize the write performance on sequential write data. Further, it is possible to secure a free block rapidly by increasing a merge size regardless of a write pattern if the number of free blocks is below a reference.

Figure 6:
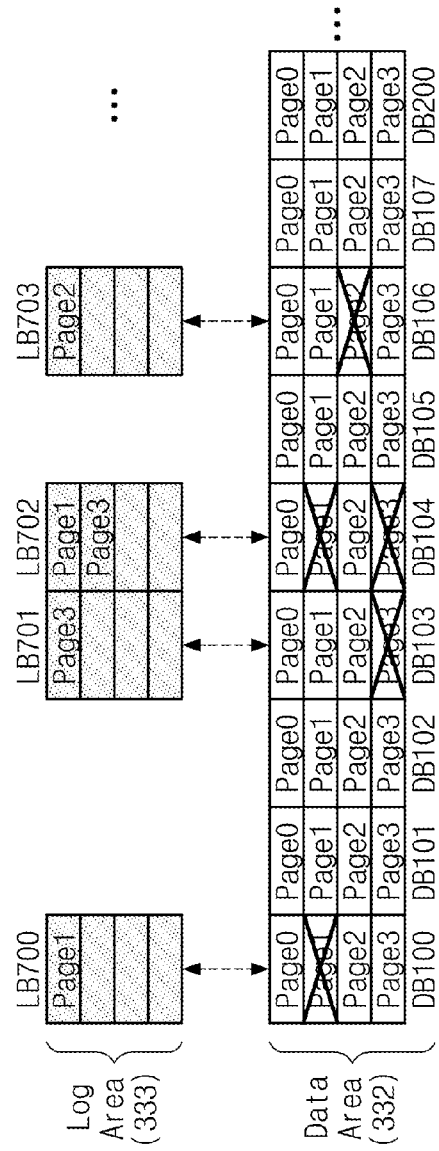
FIG. 6 is a diagram illustrating a data block and log blocks at a random write pattern.

FIG. 6 is a conceptual diagram illustrating relationships between a data block and log blocks when data is written using a random write pattern. Referring to FIG. 6, a random write pattern may necessitate relatively many log blocks. For this reason, if a write command of a random write pattern is provided, relatively many free blocks may be required. This will be more fully described below.

A data area 332 may be formed of data blocks DB100, DB101, . . . , DB109 having physical block numbers 100, 101, . . . , 109. A log area may be formed of log blocks LB700, LB701, LB702, and LB703 having physical block numbers 700, 701, 702, and 703. Although not shown in FIG. 6, a plurality of physical blocks can be included in the free block.

As illustrated in FIG. 6, the log block LB700 may be assigned to the data block DB100, and the log block LB701 may be assigned to the data block DB103. The log block LB702 may be assigned to the data block DB104, and the log block LB703 may be assigned to the data block DB106.

Upon a data write request, a flash translation layer 320 (refer to FIG. 4) may check whether a log block assigned to a corresponding data block exists. If a log block assigned to a corresponding data block exists, write-requested data may be written in the assigned log block. If no log block assigned to a corresponding data block exists, the flash translation layer may assign one of free blocks as a new log block corresponding to the corresponding data block.

A physical page PPN0 of the log block LB700 may be used to store a logical page Page1 of the data block DB100. A physical page PPN1 of the data block DB100 may be invalidated. A physical page PPN0 of the log block LB701 may be used to update a logical page Page3 of the data block DB103. A physical page PPN3 of the data block DB103 may be invalidated.

Physical pages PPN0 and PPN1 of the log block LB702 may be used to store logical pages Page1 and Page3 of the data block DB104. Data Page1 and Page3 corresponding to pages of the data block DB104 may be invalidated. A physical page PPN0 of the log block LB703 may be used to update a logical page Page2 of the data block DB106. A physical page PPN2 of the data block DB106 may be invalidated.

Using the above-described approach, relatively many log blocks must be used to write data using a random write pattern. Accordingly, if a write command using a random write pattern is executed, a memory system may perform an incremental merge operation so long as a timeout condition is avoided. In contrast, an incremental merge method according to an embodiment of the inventive concept allows the number of available free blocks to be rapidly increased (or recovered) when an insufficient number of free block for a merge operation are apparent. This is accomplished by increasing the merge size used in conjunction with the merge operation. This ability allows the constituent memory system to maintain performance efficiency even under conditions wherein the number of current free blocks is conventionally insufficient.

Figure 7:
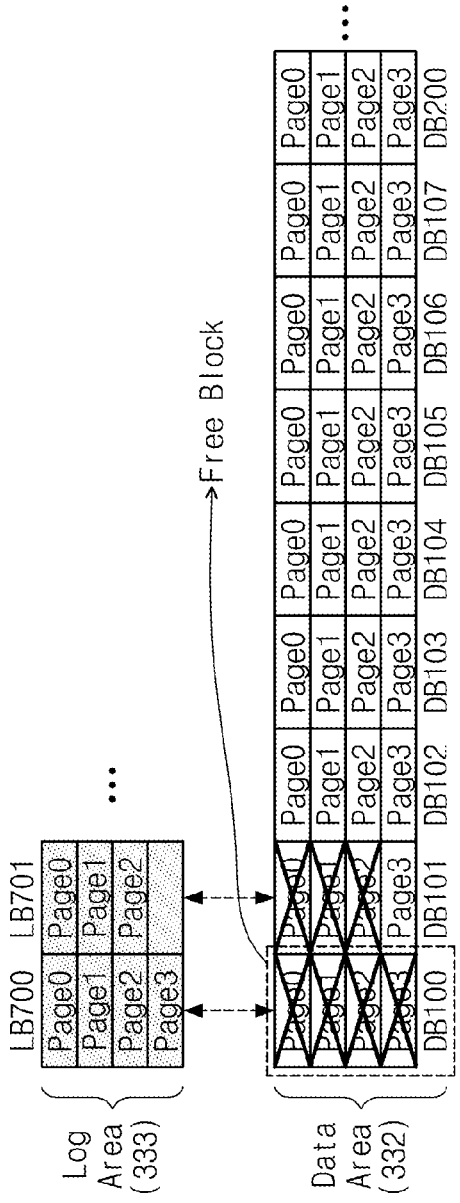
FIG. 7 is a diagram illustrating a data block and log blocks at a sequential write pattern.

FIG. 7 is a conceptual diagram illustrating relationships between data block and log blocks when data is written using a sequential write pattern. Referring to FIG. 7, a sequential write pattern may necessitate relatively fewer log blocks as compared with a random write pattern.

A data area 332 may include data blocks DB100, . . . , DB107, and DB200 having physical block numbers 100, . . . , 107, and 200. A log area 333 may be formed of log blocks LB700 and LB701 having physical block numbers 700 and 701. Although not shown in FIG. 7, a plurality of physical blocks can be included in a free area.

As illustrated in FIG. 7, the log block LB700 may be assigned to the data block DB100, and the log block LB701 may be assigned to the data block DB103. If data of a sequential write pattern is received, data may be written in a log block sequentially.

Physical pages PPN0 to PPN3 of the log block LB700 may be used to store data sequentially provided to logical pages Page0 to Page3 of the data block DB100. Previous data stored in physical pages of the data block DB100 may be invalidated. The data block DB100 may be switched directly into a free block. Accordingly, relatively fewer free blocks may be used during a command process cycle where data having a sequential write pattern is written.

Consistent with the foregoing, relatively fewer free blocks must be used for write data having a sequential write pattern. An incremental merge operation using a number of free blocks may be executed during a single write command cycle when the data has a sequential write pattern. Hence, provided the number of current free blocks is sufficient, there is no need to execute an incremental merge operation and it may be skipped. By skipping the incremental merge operation in instances where data having a sequential write pattern is written to a sufficient number of free blocks, overall write operation performance may be improved. However, when the number of current free blocks is less than a reference number, the merge size may be increased during a write command cycle corresponding to a sequential write pattern.

Figure 8:
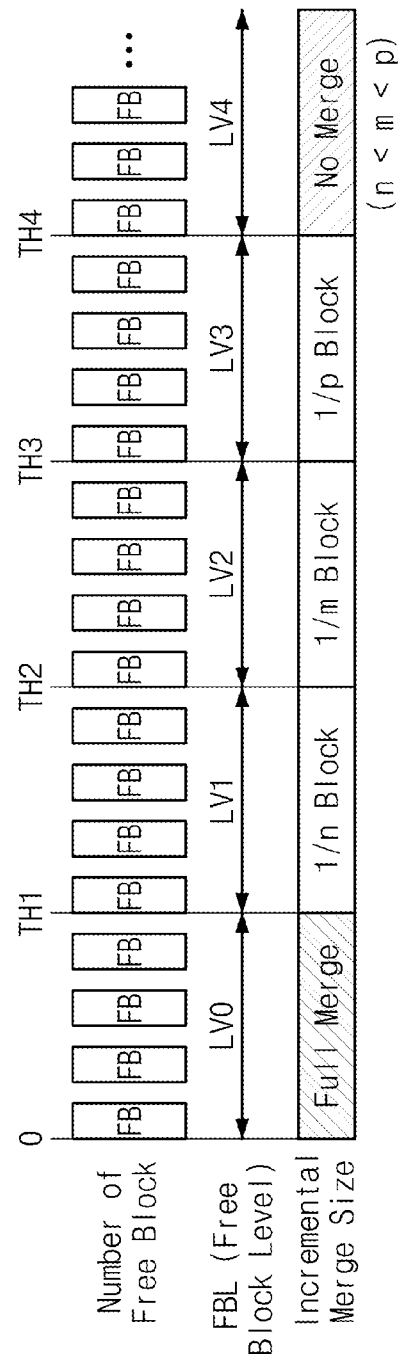
FIG. 8 is a block diagram illustrating a free block leveling method according to an exemplary embodiment of the inventive concept.

FIG. 8 is a block diagram illustrating a free block leveling method according to an embodiment of the inventive concept. Referring to FIG. 8, the number of free blocks included in a free area may be divided into a plurality of levels LV0 to LV4. The merge size for an incremental merge operation may then be determined according to a respective level.

In the event that the number of free blocks included in a free area (or, a free block pool) exceeds a fourth reference number TH4, then the free block level (hereinafter, referred to as FBL) may be determined to be level four LV4. If a FBL corresponds to the level four LV4, then no incremental merge operation is necessary for data having a sequential write pattern and the merge size for the incremental merge operation may be set of "No merge".

If the number of free blocks exceeds a third reference number TH3 but remains below a third reference number TH4, the FBL may be determined to be the level three LV3. When the FBL is level three LV3, the merge size of the incremental merge operation may be determined such that data having a size of 1/p block (e.g., 1-page) is merged during one cycle of the incremental merge operation.

If the number of free blocks exceeds a second reference number TH2 but remains below the third reference number TH3, the FBL may be determined to be level two LV2. In the event that the FBL is level two LV2, the merge size for the incremental merge operation may be determined such that data having a size of 1/m block (e.g., 4-page) is merged during one cycle of the incremental merge operation.

If the number of free blocks exceeds a first reference number TH1 but remains below the second reference number TH2, the FBL may be determined to be the level one LV1. In the event that the FBL is level one LV1, the merge size of the incremental merge operation may be determined such that data having a size of 1/n block (e.g., 8-page) is merged during one cycle of the incremental merge operation. In the illustrated example, "n", "m", and "p" are natural numbers, wherein n<m<p.

If the number of free blocks is less than the first reference number TH1, the FBL may be determined to be level zero LV0. In the event that the FBL corresponds to level zero LV0, the merge size of the incremental merge operation may be determined such that data having a size of one block is merged during one cycle of the incremental merge operation. Accordingly, if the FBL is level zero LV0, data corresponding to one block may be merged during a single write command cycle.

Thus, a FBL at level zero LV0 may indicate a number of free blocks that is strictly insufficient. A FBL at level four may indicate a number of free blocks that is clearly sufficient. A FBL between level three LV3 and level one LV1 may indicate intervening free block levels (e.g., possibly sufficient) between the strictly insufficient and sufficient states.

In the foregoing description of a free block leveling method only four (4) reference numbers and four (4) FBLs are used. Those skilled in the art will recognize these numbers are merely exemplary and any reasonable number of FBLs and corresponding reference numbers might be used in embodiments of the inventive concept.

Figure 9:
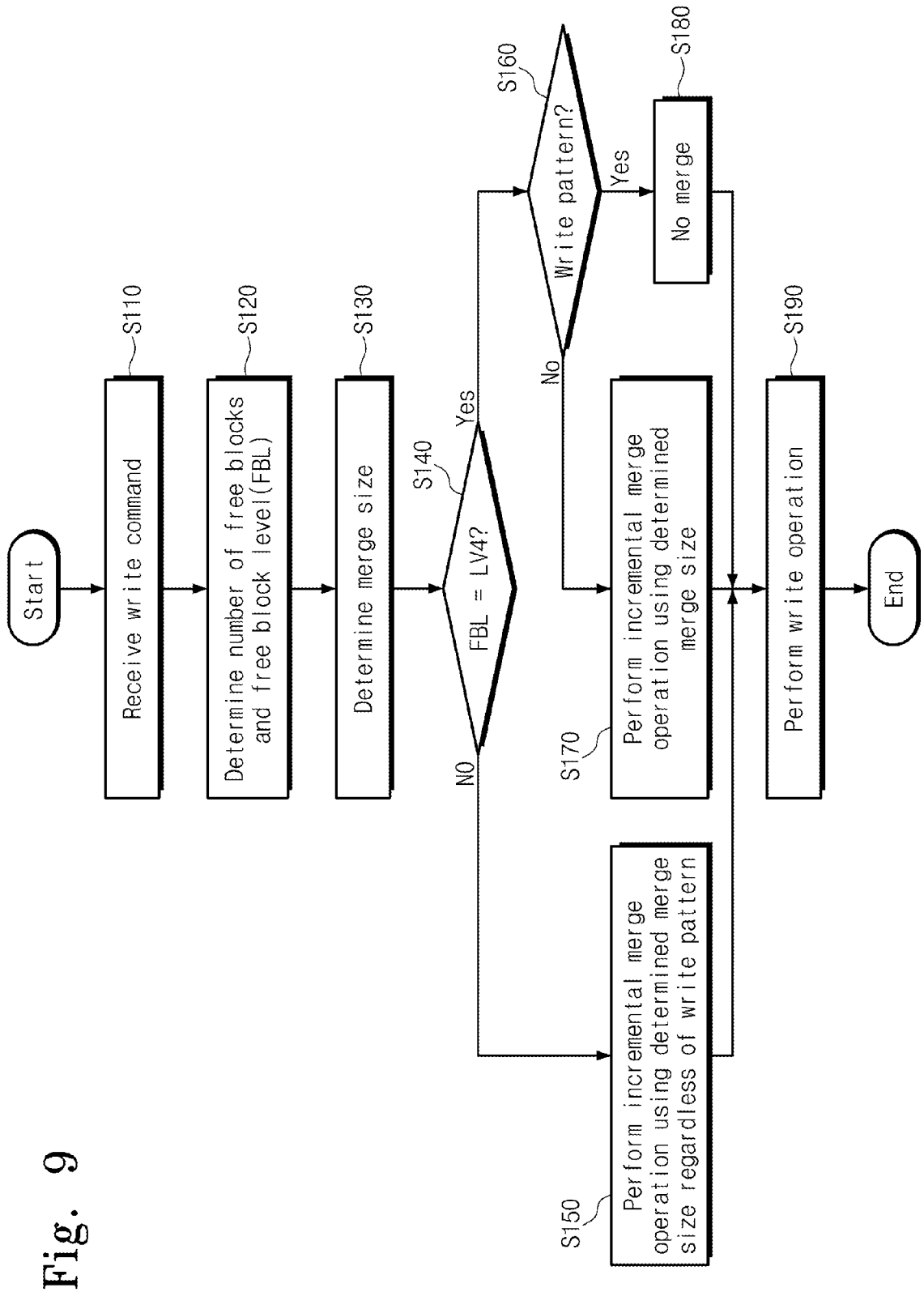
FIG. 9 is a flowchart illustrating an incremental merge method according to an exemplary embodiment of the inventive concept.

FIG. 9 is a flowchart summarizing an incremental merge method according to an embodiment of the inventive concept. In FIG. 9, there is illustrated an incremental merge method capable of adjusting a merge size in accordance with a number of free blocks and a write pattern for data being stored.

Referring to FIGS. 1, 4 and 9, the memory controller 120 receives a write command from the host 110 (S110). The FTL 320 running on the memory controller 120 in response to the write command may be used to control the definition of an incremental merge operation according to an embodiment of the inventive concept.

For example, the FTL 320 may detect a current number of free blocks in the free block pool, and use the number of free blocks to determine a free block level (FBL) (S120). Of course, the number of currently available free blocks will vary from instant to instant according to memory management operations (e.g., garbage collection) and in response to externally indicated write and erase commands. Thus, the determination of a number of free blocks must be a dynamic one, usually performed in one-for-one correspondence to a received write command. Once the number of free blocks is determined, the FTL 230 may also determine a corresponding FBL. The assumptions used in the description of FIG. 8 will be used in the working method example, of FIG. 9.

Accordingly, in view of a determined FBL (e.g., LV0 through LV4), the FTL 320 may be used to determine a merge size (S130). For example, a merge size may be determined using the approach described with reference to FIG. 8. That is, different merge sizes may be determined in relation to different FBLs.

The FTL 320 may then be used to determine whether the number of free blocks is sufficient for the data to be stored in response to the received write command. For example, the FTL 320 may determine whether the FBL corresponds to level four LV4 (or some other appropriate level, e.g., LV0 to LV3) (S140). In the illustrated example of FIG. 9, a level four LV4 determination (S140=YES) indicating that there are sufficient free blocks currently available in the free block pool (i.e., LV4 is a defined "sufficiency FBL") is followed by a determination regarding write pattern. For example, a determination may be made as to whether the write pattern is a sequential write pattern (S160). And if a sequential write pattern is identified (S160=YES), then the no merge operation is necessary (S180) and the write command is executed (S190) without performing a merge operation (i.e., the merge operation is skipped).

However, if a random (or non-sequential) write pattern is identified (S160=NO), then an incremental merge operation is executed using the merge size, as previously determined (S130) in relation to the FBL (S170).

In contrast, if the FBL is not level four (LV4) (S140=NO), then the FTL 320 causes incremental merge operation to be executed using the merge size, as previously determined (S130) in relation to the FBL without regard to the write pattern of the data associated with the write command (S150).

Once the incremental merge operation is performed (S150, S170), then the write operation indicated by the write command may be executed (S190).

In the foregoing method according to an embodiment of the inventive concept, the FTL 320 may be used to analyze the write pattern. In particular, the write pattern analyzer 322 included in the FTL 320 may be used to determine the nature of the write pattern based, for example, the write command, write address(es) received in conjunction with the write command, and/or the write data received in conjunction with the write command.

The write pattern analyzer 322 may determine the write pattern in various manners. For example, the write pattern analyzer 322 may recognize input data as a random write pattern when a size of continuously input data is less than a minimum reference size (e.g., 16 KB). Alternatively, the write pattern analyzer 322 may determine the write pattern using an algorithm such as LRU (Least Recently Used) algorithm, CFLRU (Clean-First LRU) algorithm, CA (Clock Algorithm) algorithm, SC (Second Chance) algorithm, MDH (Multi-Dimensional Hashing) algorithm, etc.

Of further note, the incremental merge operation (S150, S170) may be executed using an appropriately determined (e.g., minimal) merge size defined in accordance with the number current free blocks and a corresponding FBL. Under such circumstances, the incremental merge operation will be executed in a manner that satisfies a time-out condition or other memory system resource and operating constraints.

During execution of the write operation (S190), the memory controller 120 may write the write-requested data in a selected memory block because an incremental merge operation, if necessary, has been completed. For example, write data may be programmed in a log block assigned to the selected data block. Once the write data has been programmed, a write cycle corresponding to one write command is ended.

With the incremental merge operation according to embodiments of the inventive concept, the amount of data merged during a partial merge operation (i.e., the merge size) may be adaptively varied in accordance with a number of current free blocks, as well as in response to a detected write pattern. In the event that the number of free blocks is deemed insufficient, more free blocks may be rapidly secured by increasing the merge size regardless of write pattern. Yet, as the number of current free blocks increases, the merge size may be decreased. In particular, no incremental merge operation will be executed during a current command process cycle when sufficient free blocks are available and data has a sequential write pattern. Accordingly, it is possible to improve write performance efficiency.

Figure 10:
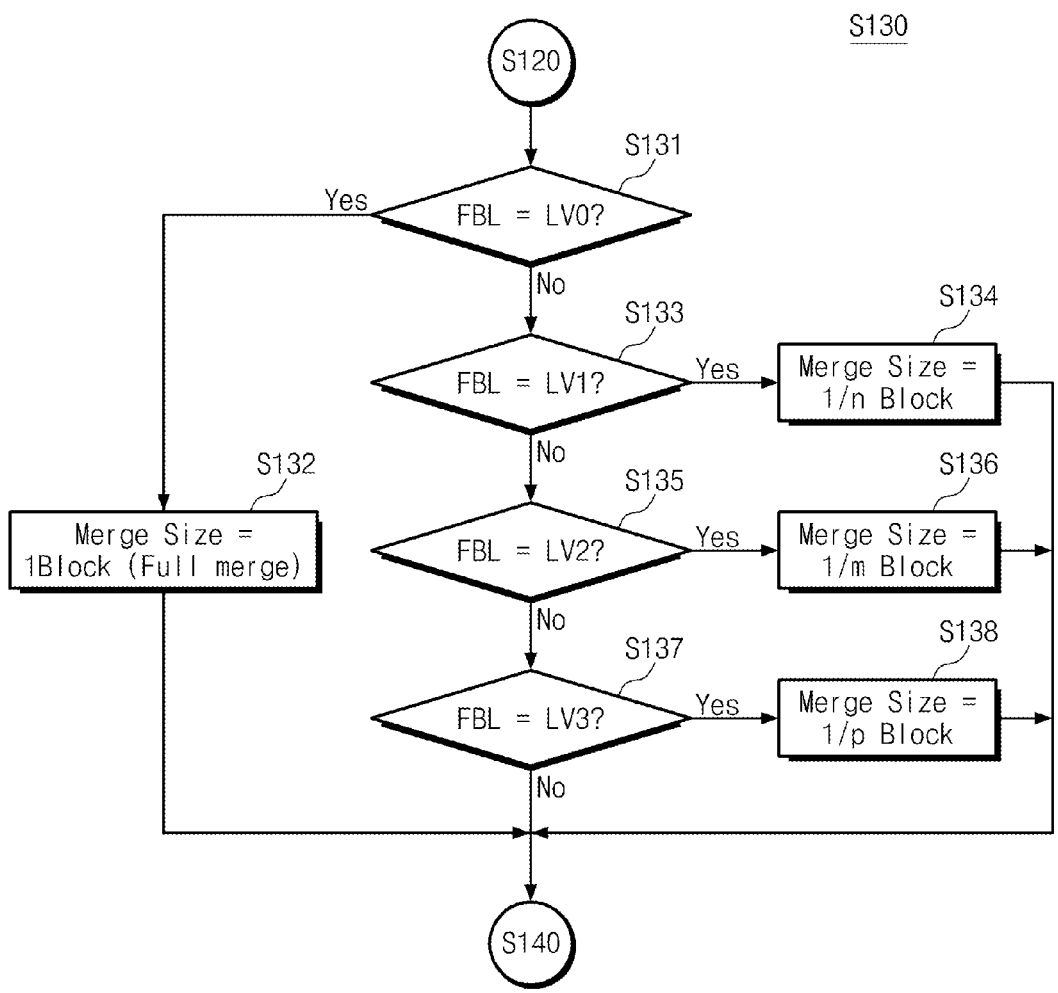
FIG. 10 is a flowchart illustrating step S130 in FIG. 9.

FIG. 10 is a flowchart further illustrating one possible approach to the step of determining merge size (e.g., S130 in FIG. 9). Here again, the assumptions of FIG. 8 are used, and FIG. 10 determines merge size in accordance with a determined free block level (FBL).

Referring to FIGS. 1, 4, and 10, the FTL 320 first determines whether the FBL is level zero LV0 (S131). A FBL of zero (S131=YES) indicates a number of free blocks that is strictly insufficient. Accordingly, a merge size of "1 Block" (e.g., a full merge size) is selected (S132).

If the FBL is not at level zero LV0 (S131=NO), then the FTL 320 next determines whether the FBL is level one LV1 (S133). If the FBL is level one (LV1) (S133=YES), then a merge size of "1/n Block" is selected (S134).

Similarly, if the FBL is not at level one LV1 (S133=NO), then the FTL 320 next determines whether the FBL is level two LV2 (S135). If the FBL is level two LV2 (S135=YES), then a merge size of "1/m Block" is selected (S136). And if the FBL is not at level two LV2 (S135=NO), then the FTL 320 next determines whether the FBL is level three LV3 (S137). If the FBL is level three LV3 (S137=YES), then a merge size of "1/p Block" is selected (S138).

Thus, according to the foregoing example, an appropriate merge size may be efficiently defined. When the number of free blocks is deemed to be strictly insufficient, additional free blocks may be rapidly obtained using a full merge size and regardless of write pattern (S132). Relatively more available free blocks results in the definition of smaller, more efficient merge sizes taking into account such memory system conditions as write pattern. Of course, the variables "n", "m" and "p" used in divide down the maximum merge size of 1 full block in the foregoing example may be defined according to memory system resources and constraints, but as illustrated, the relatively more free blocks (increasing FBL), the smaller the corresponding merge size (e.g., $n < m < p$).

Figure 11:
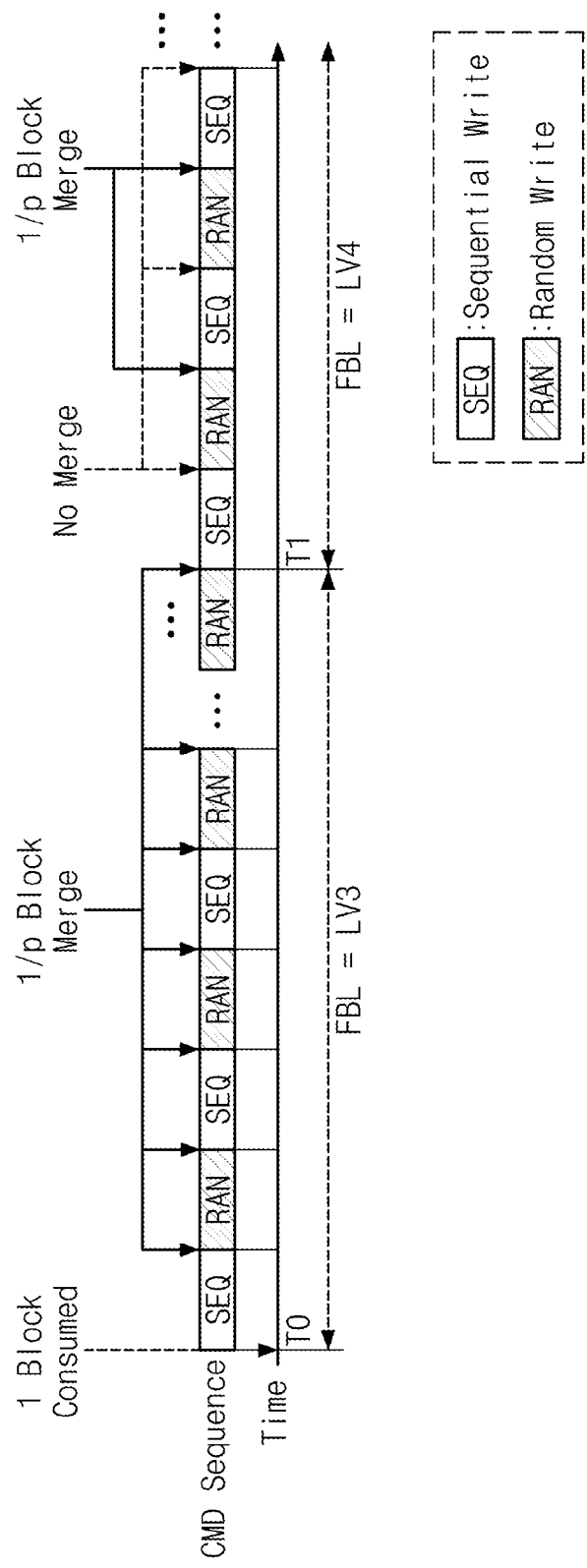
FIG. 11 is a diagram illustrating a merge operation according to an exemplary embodiment of the inventive concept at a command sequence where sequential write and random write are provided in turn.

FIG. 11 is a diagram illustrating a merge operation according to an embodiment of the inventive concept according to an example command sequence including sequential write (SEQ) and random write (RAN) commands. Referring to FIG. 11, it is assumed that at time T0, one free block is consumed and sequential and random write commands are input in turn. This command sequence may be provided, for example, during a speed class test scenario used to evaluate the write performance of a memory system.

It is further assumed that at time T0 the FBL is level three LV3 in view of a number of free blocks. Under such circumstances, an incremental merge operation is executed over a plurality of write command cycles between intervening sequential write operations. With a reference in FIGS. 8, 10 and 11, data having a size of 1/p block is merged during a single write command cycle regardless of write pattern type. A free block may be additionally consumed during execution of each command, or a free block can be created.

It is assumed that the FBL changes from level three LV3 to level four LV4 at time T1 in response to execution of command cycles and the incremental merge operation during time period T0. Under these circumstances, the merge size is changed during time period T1 from the previous conditions during time period T0. Since the FBL is level four LV4, no merge operation is made during a first command cycle in response to a sequential write pattern. Thereafter, an incremental merge operation is executed using a merge size of 1/p block.

Accordingly, the process performance of a command corresponding to a sequential write pattern may be improved when the FBL is level four LV4 indicating that a sufficient free blocks are available due to the foregoing skipped merge operation. The improvement of the write performance of the memory system may be expected considering that the sequential write performance is an important factor in determining overall write performance of the memory system.

Figure 12A:
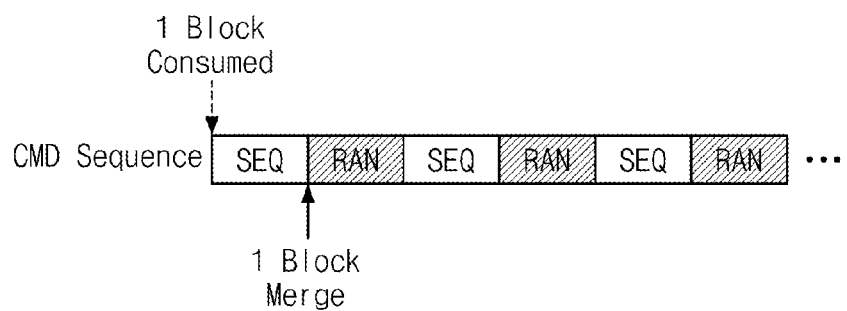
FIGS. 12A to 12C are diagrams illustrating the write performance in various merge manners under the condition that the number of free blocks is sufficient.
Figure 12B:
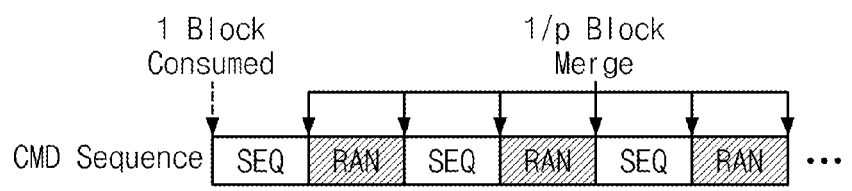
Figure 12C:
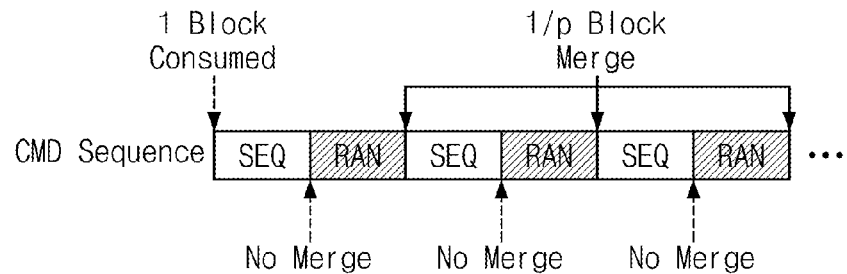

FIGS. 12A, 12B and 12C are diagrams further illustrating write performance in the context of various merge manners under the condition that the number of free blocks is sufficient. FIG. 12A shows the case that a general merge manner is used, FIG. 12B shows the case that a general incremental merge manner is used, and FIG. 12C shows the case that an incremental merge manner according to an exemplary embodiment of the inventive concept is used.

Referring to FIG. 12A which shows a general merge manner, it is assumed that one block is consumed under the condition that free blocks are secured sufficiently. A merge operation for generating one free block may be made at an execution cycle of a first input sequential write command SEQ of continuously input write requests. If the required to perform the merge operation becomes overly long, it is difficult to satisfy certain time-out conditions defined by the host.

Referring to FIG. 12B, although free blocks may be sufficiently obtained, an incremental merge operation may performed during an execution cycle for each of the continuously input write commands. Accordingly, incremental merge may be made the same as a command execution cycle of a random write pattern even at a cycle where a write request of a sequential write pattern is executed. Accordingly, the performance of a sequential write operation may be improved.

Referring to FIG. 12C, in the event that sufficient free blocks are secured, an incremental merge may operation may be made selectively according to a write pattern. For example, no incremental merge may be executed at a command cycle of a sequential write pattern. Incremental merge may be made only at a command cycle of a random write pattern. Accordingly, the write performance may be improved by simplifying the process cycle associated with sequential write data.

Figure 13:
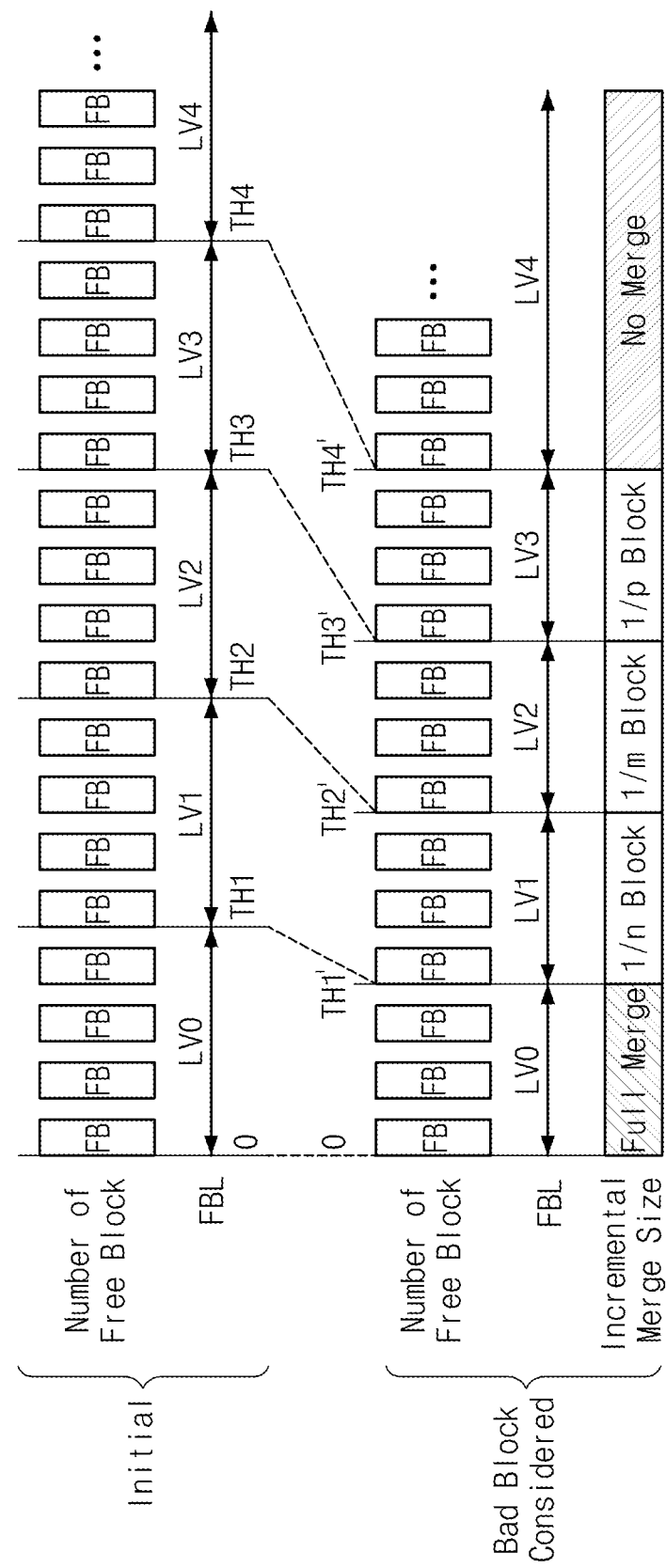
FIG. 13 is a diagram illustrating another embodiment of the inventive concept.

FIG. 13 is a conceptual diagram illustrating another embodiment of the inventive concept. Due to a well understood 'wear level" phenomenon flash memory devices over time may develop one or more bad blocks as the result of repeated program and erase operations. Data stored in a bad block cannot be deemed reliable, so the FTL must account for and prevent data from being stored in a bad block. Accordingly, as the number of bad blocks increases over time, there are relatively fewer memory blocks that may be used as a data block, a log block, and a free block. Wear leveling over the full range of available memory blocks, particularly when respectively made available as a free block, can extend the lifecycle of the individual memory blocks and the memory system as a whole.

Drawing upon the foregoing, if a number of bad blocks in a memory system remains below a defined "bad block maximum" (K), the FBL (and corresponding merge sizes) at any given moment of time may be determined in relation to a first or initial set of reference numbers (e.g., TH1, TH2, TH3, and TH4) as described above with reference to FIG. 8.

However, when the number of bad blocks exceeds the bad block maximum, a wear leveling functionality may be integrated into the foregoing approach for performing a merge operation. That is, once the number of bad bocks exceeds the bad block maximum, a different (second) set of reference numbers (e.g., TH1', TH2', TH3', and TH4') may be used to establish FBLs (LV0, LV1, LV2, LV3 and LV4) in relation to a number of current free blocks in similar manner to that described above.

The merge sizes for an incremental merge operation respectively associated with each of the FBLs (LV0, LV1, LV2, LV3, and LV4) may be the same as those described above for methods that do not take into account memory block cell wear leveling—only the threshold reference numbers may be changed. Alternately, one or more of the merge sizes associated with one or more FBLs may be adjusted.

Using this enhanced approach even though the number of usable memory blocks will decrease over time, such wearing out of memory blocks to bad block status may be delayed, thereby extending overall lifecycle of the memory system by adjusting established FBLs in the manner described above.

Figure 14:
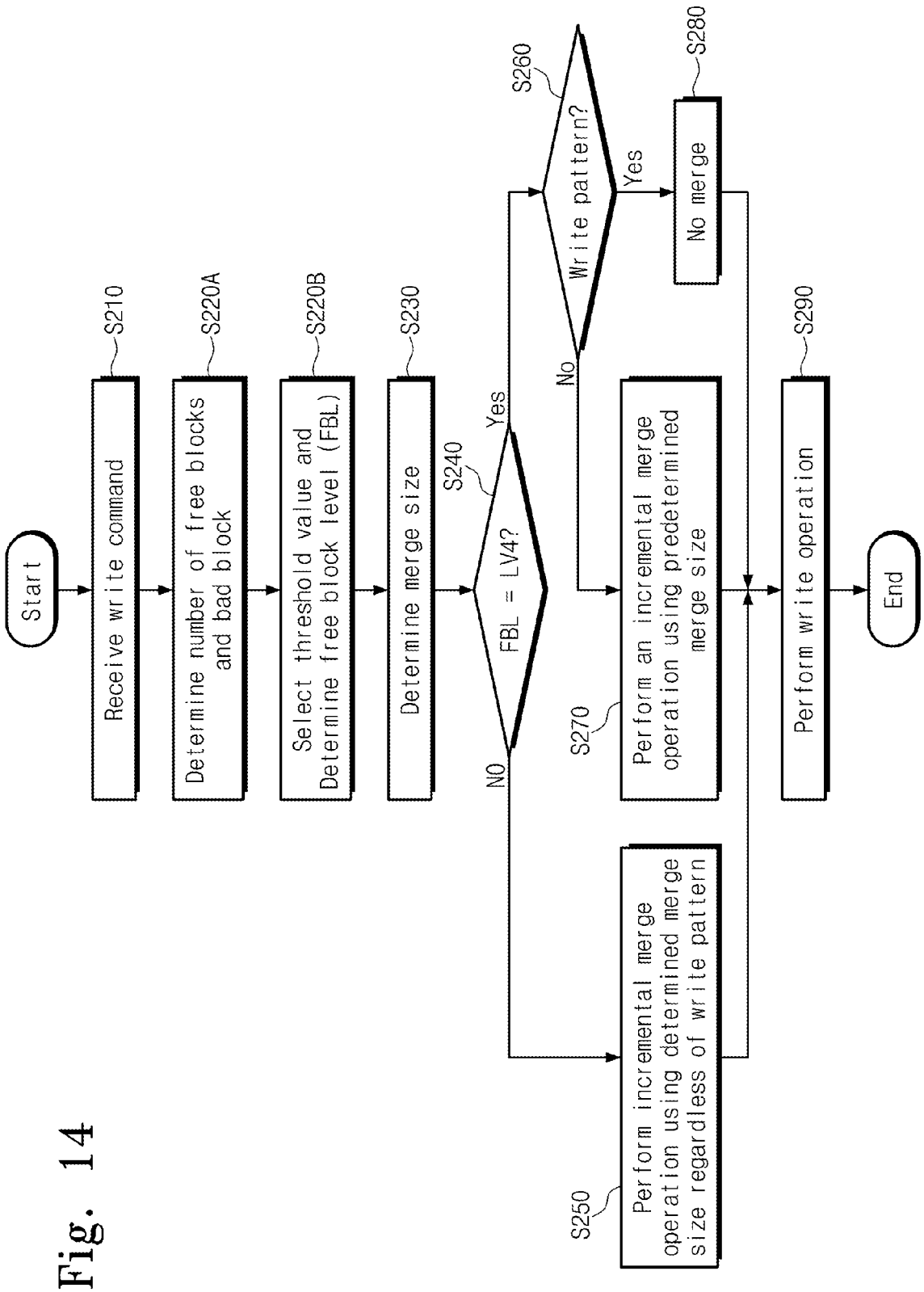
FIG. 14 is a flowchart illustrating an incremental merge method according to another exemplary embodiment of the inventive concept.

FIG. 14 is a flowchart summarizing an incremental merge method according to another embodiment of the inventive concept. The method summarized in FIG. 14 is substantially similar to that previously described in relation to FIG. 9 with analogous steps (S2XX) being performed in relation to previously described steps (S1XX). However, step S120 of the method described in relation to FIG. 9 is replaced by two (2) material steps in the method of FIG. 14. Namely, upon receiving the write command (S210), the FTL 320 determines the current number of free blocks in a free block pool and also determines the number of bad blocks existing in the flash memory (S220A). Then, with reference to both the number of current free blocks and the number of bad blocks, the FTL selects appropriate reference threshold numbers based on the number of bad blocks and then determines the appropriate FBL (S220B).

Like the method of FIG. 9, the method of FIG. 14 enables the execution of an incremental merge operation according to embodiments of the inventive concept. However, the respective FBLs are determined with reference to a number of bad blocks. This adaptation of the early approach allows wear leveling of memory cells (and constituent memory blocks) that are subject to wearing fatigue, thereby extending the useful life of the overall memory system.

Figure 15:
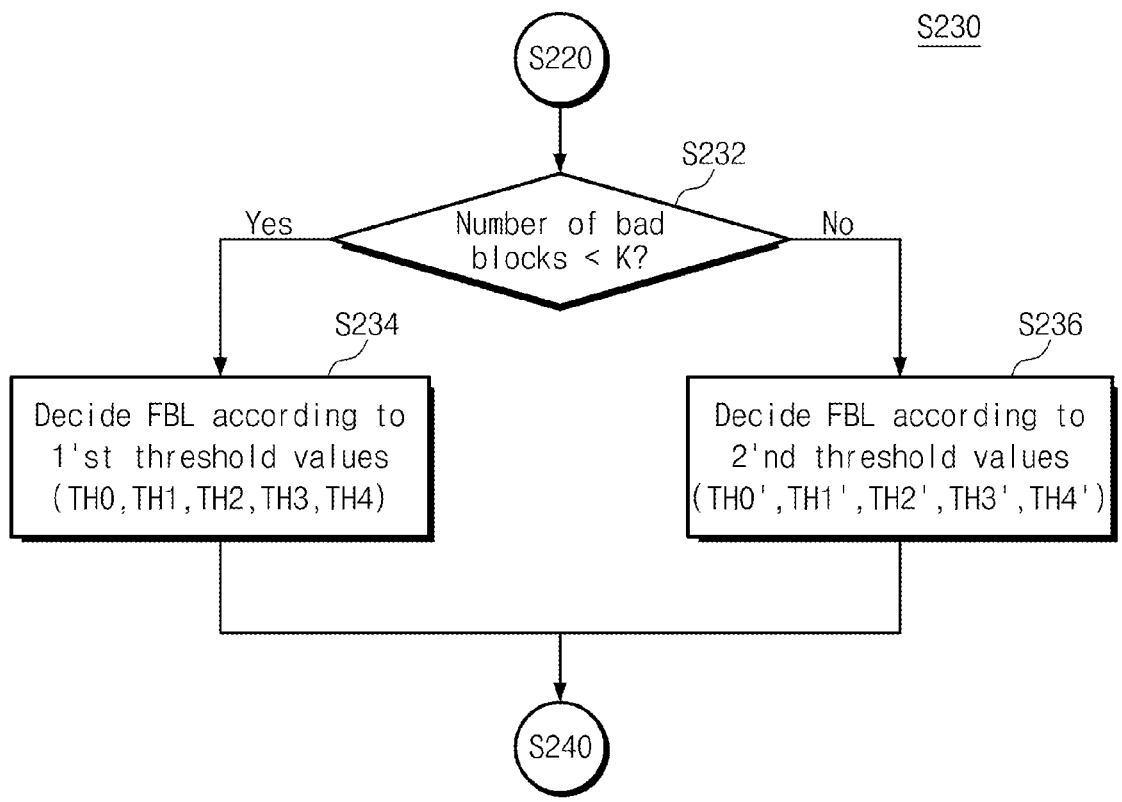
FIG. 15 is a flowchart illustrating step S230 in FIG. 14.

FIG. 15 is a flowchart further illustrating step S220B of FIG. 14. Referring to FIG. 15, different sets of threshold references may be selected in relation to a current number of bad blocks being tracked by the FTL 320 and a defined bad block maximum (K). These values are compared in step S232 of FIG. 15. So long as the number of bad blocks remains below K (S232=YES), an initial (or first) set of threshold references (TH0, TH1, TH2, TH3, and TH4) are used to determine the current FBL (S234). However, if the number of bad blocks exceeds K (S232=NO), an adjusted (or second) set of threshold references (TH0', TH1', TH2', TH3', and TH4') are used to determine the current FBL (S236).

Figure 16:
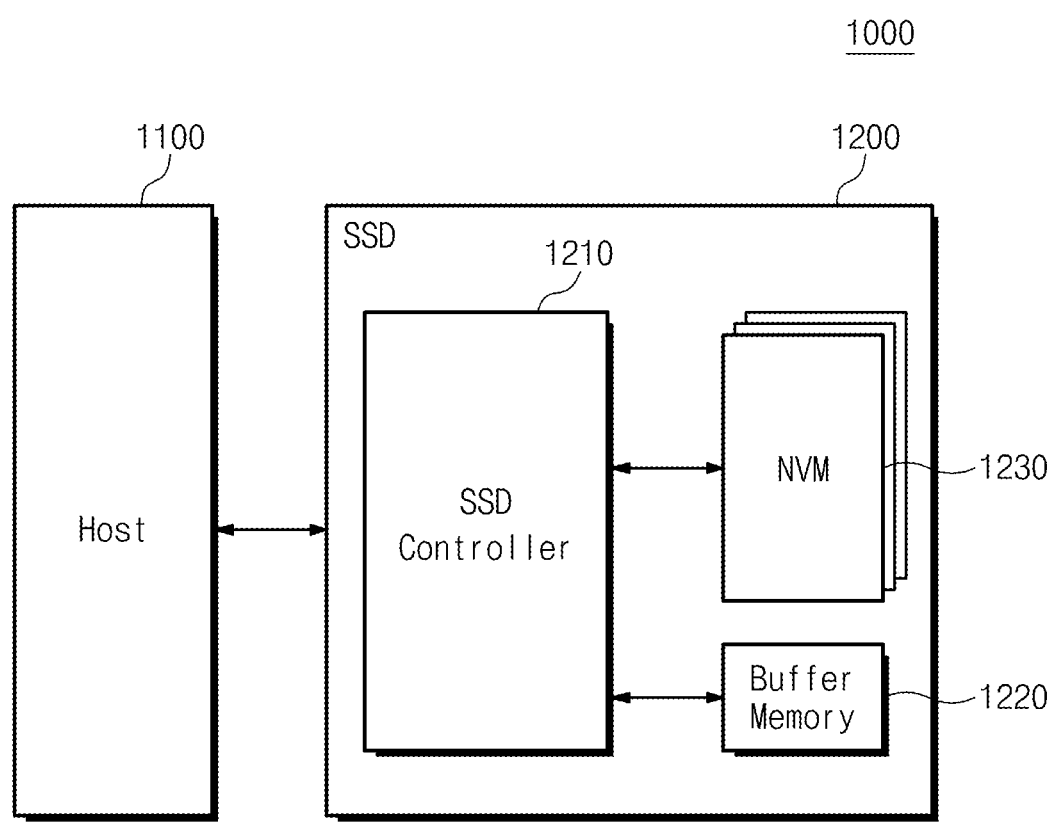
FIG. 16 is a block diagram illustrating a solid state drive system according to an exemplary embodiment of the inventive concept.

FIG. 16 is a block diagram illustrating a solid state drive system according to an exemplary embodiment of the inventive concept. Referring to FIG. 16, a solid state drive (SSD) system 1000 may include a host 1100 and an SSD 1200. The SSD 1200 may include an SSD controller 1210, a buffer memory 1220, and a nonvolatile memory device 1230.

The SSD controller 1210 may provide physical interconnection between the host 1100 and the SSD 1200. The SSD controller 1210 may provide an interface with the SSD 1200 corresponding to a bus format of the host 1100. In particular, the SSD controller 1210 may decode a command provided from the host 1100. The SSD controller 1210 may access the nonvolatile memory device 1230 according to the decoding result. The bus format of the host 1100 may include USB (Universal Serial Bus), SCSI (Small Computer System Interface), PCI express, ATA, PATA (Parallel ATA), SATA (Serial ATA), SAS (Serial Attached SCSI), and the like.

The SSD controller 1210 may execute an incremental merge operation according to the inventive concept which is made according to a write request of the host 1100 and the number of free blocks. The SSD controller 1210 may cute the incremental merge operation additionally considering the number of bad blocks. Although the incremental merge operation is made as a background operation, it can be executed by the SSD controller 1210.

The buffer memory 1220 may temporarily store write data provided from the host 1100 or data read out from the nonvolatile memory device 1230. In the event that data existing in the nonvolatile memory device 1230 is cached at a read request of the host 1100, the buffer memory 1220 may support a cache function of providing cached data directly to the host 1100. Typically, a data transfer speed of a bus format (e.g., SATA or SAS) of the host 1100 may be higher than that of a memory channel of the SSD 1200. That is, in the event that an interface speed of the host 1100 is remarkably fast, lowering of the performance due to a speed difference may be minimized by providing the buffer memory 1220 having a large storage capacity.

The buffer memory 1220 may be formed of a synchronous DRAM to provide sufficient buffering to the SSD 1200 used as an auxiliary mass storage device. However, the buffer memory 1220 is not limited to this disclosure.

The nonvolatile memory device 1230 may be provided as a storage medium of the SSD 1200. For example, the nonvolatile memory device 1230 may be formed of a NAND flash memory device having a mass storage capacity. The nonvolatile memory device 1230 may be formed of a plurality of memory devices. In this case, memory devices may be connected with the SSD controller 1210 by a channel unit. The nonvolatile memory device 1230 is not limited to a NAND flash memory device. For example, a PRAM, an MRAM, a ReRAM, a FRAM, a NOR flash memory, etc. may be used as a storage medium of the SSD 1200. Further, the inventive concept may be applied to a memory system which uses different types of memory devices together. A volatile memory device (e.g., DRAM) can be used as a storage media.

Figure 17:
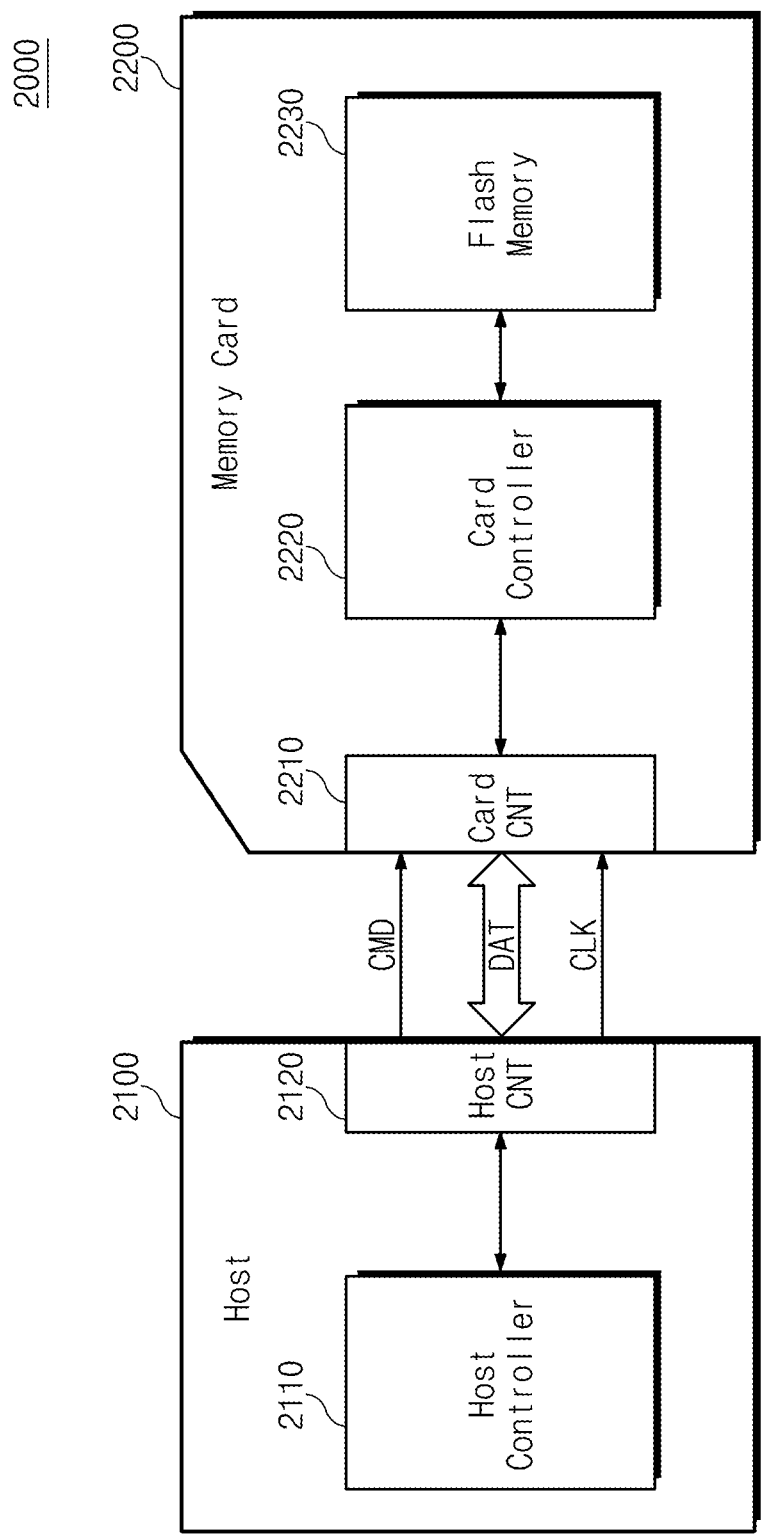
FIG. 17 is a block diagram illustrating a memory card according to an exemplary embodiment of the inventive concept.

FIG. 17 is a block diagram illustrating a memory card according to an exemplary embodiment of the inventive concept. Referring to FIG. 17, a memory card system 2000 may include a host 2100 and a memory card 2200. The host 2100 may include a host controller 2110 and a host connection unit 2120. The memory card 2200 may include a card connection unit 2210, a card controller 2220, and a flash memory 2230.

The host connection unit 2120 and the card connection unit 2210 may be formed of a plurality of pins. Such pins may include a command pin, a data pin, a clock pin, a power pin, etc. The number of pins may differentiate according to a type of the memory card 2200. In an exemplary embodiment, an SD card may include nine pins.

The host 2100 may be configured to write data in the memory card 2200 or to read data stored in the memory card 2200. The host controller 2110 may send a command (e.g., a write command), a clock signal CLK generated within a clock generator (not shown) of the host 2100, and data to the memory card 2200 via the host connection unit 2120.

The memory controller 2220 may operate responsive to a write command received via the card connection unit 2210, and may store data in the memory 2230 in synchronization with a clock signal generated by a clock generator (not shown) of the card controller 2220. The memory 2230 may store data transferred from the host 2100. For example, if the host 2100 is a digital camera, the memory 2230 may store image data.

The card controller 2220 may perform an incremental merge operation adaptively referring to a write data pattern and the number of free blocks. Accordingly, it is possible to better the whole write performance by improving the performance of a sequential write operation. The card controller 2220 may adjust a size of incremental merge referring to the number of bad blocks. Herein, the memory device 2230 may be formed of a multi-chip package including a plurality of flash memory chips. According to the memory card 2200 of the inventive concept, it is possible to perform a high-performance write operation by adaptively adjusting a size of incremental merge.

The card connection unit 2210 may be configured to communicate with an external device (e.g., a host) using one of various interface protocols such as USB, MMC, PCI-E, SAS, SATA, PATA, SCSI, ESDI, IDE, and the like.

Figure 18:
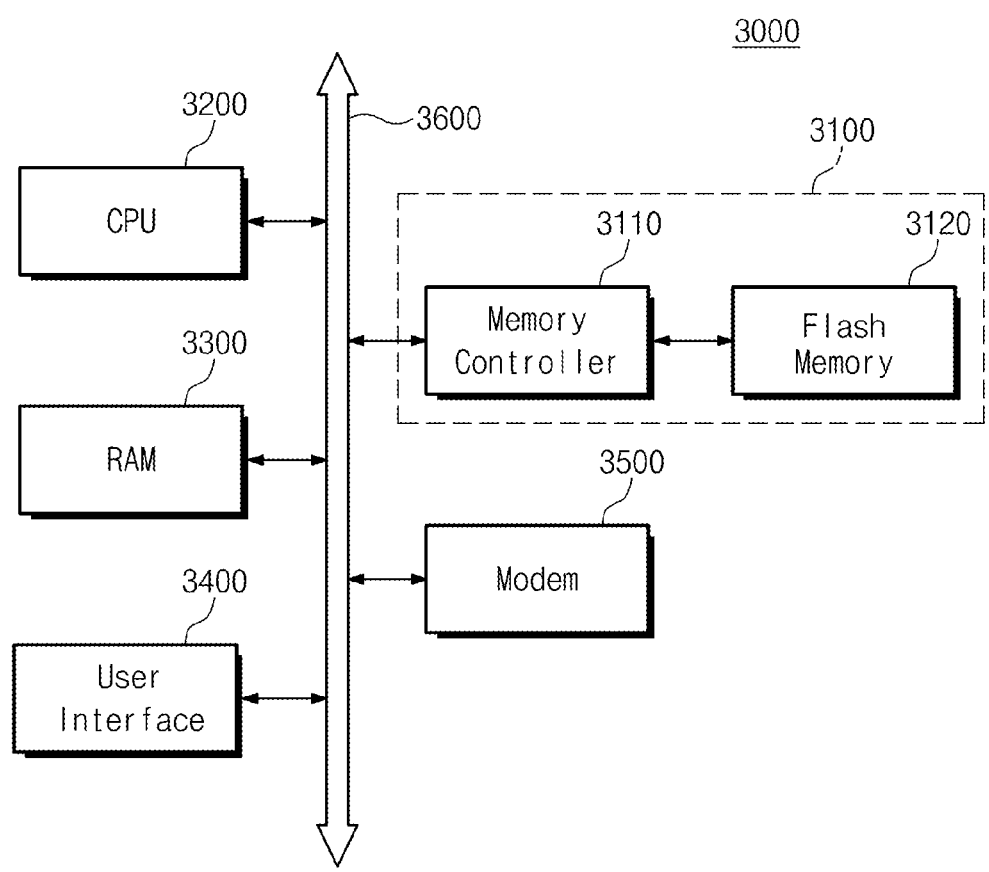
FIG. 18 is a block diagram illustrating a computing system including a flash memory device according to an exemplary embodiment of the inventive concept.

FIG. 18 is a block diagram illustrating a computing system including a flash memory device according to an exemplary embodiment of the inventive concept. A computing system 3000 may include a microprocessor 3200, a RAM 3300, a user interface 3400, a modem 3500 such as a baseband chipset, and a memory system 3100 which are electrically connected with a system bus 3600. The memory system 3100 may be configured the same as an SSD in FIG. 16 or a memory card in FIG. 17.

If the computing system 3000 is a mobile device, it may further include a battery (not shown) which powers the computing system 4000. Although not shown in FIG. 18, the computing system 3000 may further include an application chipset, a camera image processor (CIS), a mobile DRAM, and the like. The memory system 4100 may be a solid state drive/disk (SSD) which uses a nonvolatile memory to store data. Alternatively, the memory system 3100 may be formed of a fusion flash memory (e.g., a One-NAND® flash memory).

Upon a write request of the microprocessor 3200, the memory controller 3110 may perform an incremental merge operation adaptively referring to a write data pattern and the number of free blocks. Accordingly, it is possible to better the whole write performance by improving the performance of a sequential write operation. The memory controller 3110 may adjust a size of incremental merge referring to the number of bad blocks. Herein, the flash memory 3120 may be formed of a multi-chip package including a plurality of flash memory chips. According to the memory system 3100 of the inventive concept, it is possible to perform a high-performance write operation by adaptively adjusting a size of incremental merge.

Consistent with the foregoing example embodiments, a nonvolatile memory system according to an embodiment of the inventive may adaptively adjust a merge size used in conjunction with an incremental merge operation in relation to certain memory system conditions, such as a number of current free blocks and/or a detected write pattern. Accordingly, the efficiency of the incremental merge operation may be improved, and it is possible to implement a memory system capable of performing a write operations at a relatively higher speed.

The above-disclosed subject matter is to be considered illustrative, and not restrictive, and the appended claims are intended to cover all such modifications, enhancements, and other embodiments, which fall within the scope of the inventive concept. Thus, to the maximum extent allowed by law, the scope is to be determined by the broadest permissible interpretation of the following claims and their equivalents, and shall not be restricted or limited by the foregoing detailed description.

What is claimed is:

1. A method of executing a write operation in a nonvolatile memory system including a plurality of memory blocks, the method comprising:
 receiving a write command indicating the write operation and write data associated with the write operation;
 determining a number of free blocks and a number of bad blocks among the plurality of memory blocks;
 selecting a set of free block level (FBL) threshold references from among a collection of FBL threshold reference sets in accordance with the number of bad blocks;
 using the selected set of FBL threshold references and the number of free blocks to determine a selected FBL from among a plurality of FBLs;
 determining a selected merge size for use by a merge operation responsive to the write command in accordance with the selected FBL, wherein the selected merge size is determined by selecting the selected merge size from a plurality of merge sizes that correspond one-for-one with the plurality of FBLs;
 comparing the selected FBL to a sufficiency FBL indicating a sufficient number of free blocks is available to store the write data;
 if the selected FBL is lower than the sufficiency FBL, performing an incremental merge operation as the merge operation using the selected merge size; and
 following performing of the incremental merge operation, performing the write operation.

2. The method of claim 1, further comprising:
 if the selected FBL is not less than the sufficiency FBL, detecting a write pattern for the write data; and
 if the write pattern is a sequential write pattern, performing the write operation without first performing the merge operation, else performing the incremental merge operation as the merge operation using the selected merge size.

3. The method of claim 2, wherein the plurality of FBLs ranges from a highest FBL to a lowest FBL, and
 the plurality of merge sizes ranges from a full merge size for a full merge operation corresponding to the lowest FBL over progressively smaller merge sizes that respectively correspond to increasingly higher FBLs, such that the smallest merge size corresponds to the highest FBL.

4. A memory system comprising:
 a nonvolatile memory device including a plurality of memory blocks; and
 a memory controller configured in response to a write command indicating a write operation for write data to control the nonvolatile memory device and selects a merge size for use during a merge operation responsive to the write command,
 wherein the memory controller selects the merge size by determining a number of free blocks and then determining a selected free block level (FBL) from among a plurality of FBLs in accordance with the number of free blocks,
 wherein the merge size is selected by the memory controller from a plurality of merge sizes that correspond one-for-one with the plurality of FBLs,
 wherein the memory controller is further configured to compare the selected FBL to a sufficiency FBL indicating a sufficient number of free blocks is available to store the write data;
 if the selected FBL is lower than the sufficiency FBL, the memory controller executes an incremental merge operation as the merge operation using the selected merge size; and
 following execution of the incremental merge operation, the memory controller executes the write operation.

5. The memory system of claim 4, wherein the memory controller is further configured such that if the selected FBL is not less than the sufficiency FBL, the memory controller detects a write pattern for the write data, if the write pattern is a sequential write pattern, the memory controller executes the write operation without first performing the merge operation, else the memory controller executes the incremental merge operation as the merge operation using the selected merge size.

6. The memory system of claim 5, wherein the plurality of FBLs ranges from a highest FBL to a lowest FBL, and the plurality of merge sizes ranges from a full merge size for a full merge operation corresponding to the lowest FBL over progressively smaller merge sizes that respectively correspond to increasingly higher FBLs, such that the smallest merge size corresponds to the highest FBL.

7. The memory system of claim 5, wherein the memory system is a flash memory system and the memory controller includes:
 a flash translation layer (FTL) that selects the merge size for use during the merge operation, determines the number of free blocks, and determines the selected FBL; and
 a write pattern analyzer that detects the write pattern for the write data.

8. A memory system comprising:
 a nonvolatile memory device including a plurality of memory blocks; and
 a memory controller configured in response to a write command indicating a write operation for write data to control the nonvolatile memory device and selects a merge size for use during a merge operation responsive to the write command,
 wherein the memory controller selects the merge size by determining a number of free blocks and then determining a selected free block level (FBL) from among a plurality of FBLs in accordance with the number of free blocks, and
 wherein the memory system is a flash memory system and the memory controller includes a flash translation layer (FTL) that selects the merge size for use during the merge operation, determines the number of free blocks, and determines the selected FBL.

9. A memory system comprising:
 a nonvolatile memory device including a plurality of memory blocks; and
 a memory controller configured in response to a write command indicating a write operation for write data to control the nonvolatile memory device,
 wherein the memory controller includes a flash translation layer (FTL) that is configured to:

determine a number of free blocks and a number of bad blocks among the plurality of memory blocks;

select a set of free block level (FBL) threshold references from among a collection of FBL threshold reference sets in accordance with the number of bad blocks;

using the selected set of FBL threshold references and the number of free blocks, determine a selected FBL from among a plurality of FBLs; and determine a selected merge size for use by a merge operation responsive to the write command in accordance with the selected FBL wherein the merge size is selected by the memory controller from a plurality of merge sizes that correspond one-for-one with the plurality of FBLs, wherein the FTL is further configured to compare the selected FBL to a sufficiency FBL indicating a sufficient number of free blocks is available to store the write data;

if the selected FBL is lower than the sufficiency FBL, the memory controller executes an incremental merge operation as the merge operation using the selected merge size; and following execution of the incremental merge operation, the memory controller executes the write operation.

* * * * *